G. E. RIDER.
BALING PRESS.
APPLICATION FILED JULY 12, 1907.

915,626.

Patented Mar. 16, 1909.
2 SHEETS—SHEET 1.

Witnesses
Frank P. Glore
H. C. Rodgers

Inventor
Geo. E. Rider
By George H. Thorpe Atty

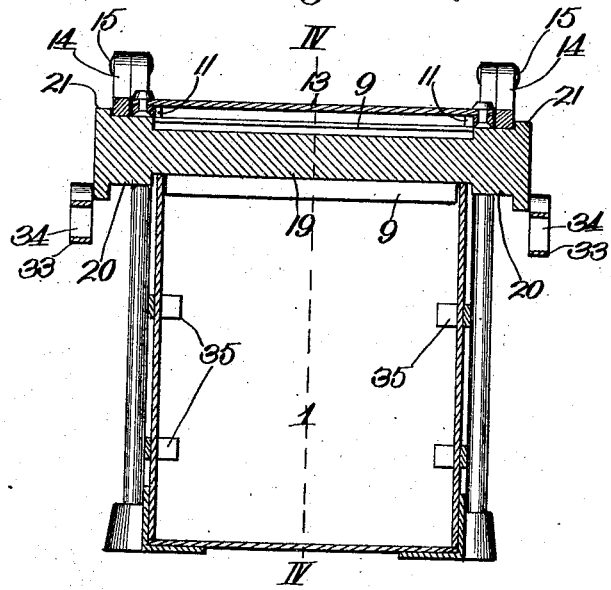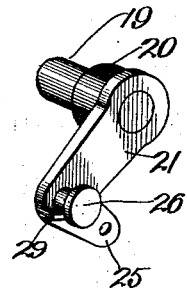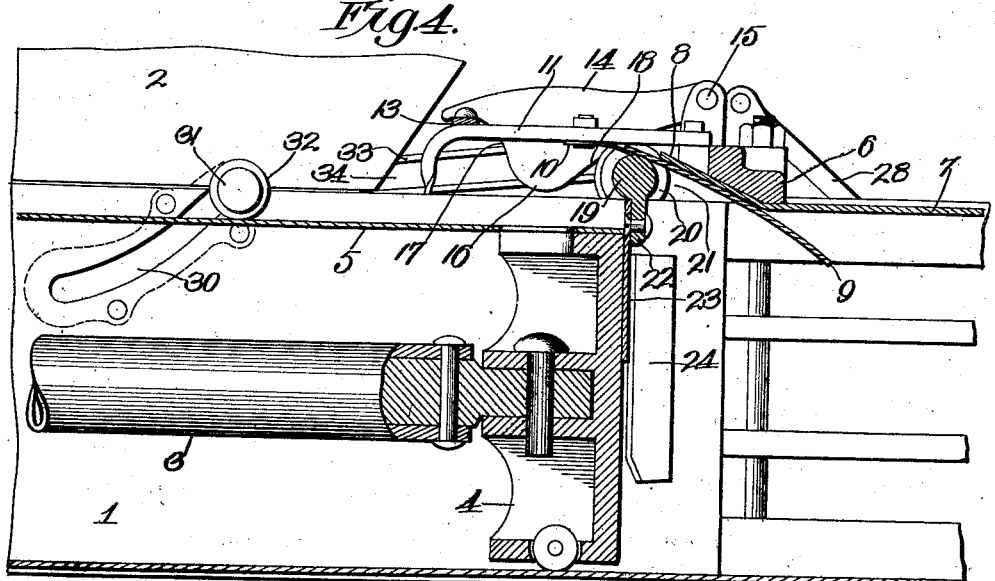

UNITED STATES PATENT OFFICE.

GEORGE E. RIDER, OF KANSAS CITY, MISSOURI.

BALING-PRESS.

No. 915,626.  Specification of Letters Patent.  Patented March 16, 1909.

Application filed July 12, 1907. Serial No. 383,526.

*To all whom it may concern:*

Be it known that I, GEORGE E. RIDER, citizen of the United States, residing at Kansas City, in the county of Jackson and State of Missouri, have invented certain new and useful Improvements in Baling-Presses, of which the following is a specification.

This invention relates to baling presses, and my object is to produce a self-feeder for efficiently and reliably forcing charges of baling material from the hopper into the baling-chamber and for bridging the space above and at the front end of the plunger to eliminate any possibility of any of the baling material becoming wedged on top of the plunger and interfering with the free withdrawal of the latter.

A further object is to produce means whereby the plunger shall, in each compression stroke, quickly effect the feed-stroke of the feeder.

A still further object is to produce means for returning the feeder to its initial position as the recoil of the plunger occurs, and finally my object is to produce a baling press which embodies the features of advantage enumerated in simple, compact, strong and durable form.

To these ends the invention consists in certain novel and peculiar features of construction and organization as hereinafter described and claimed; and in order that it may be fully understood reference is to be had to the accompanying drawings, in which:—

Figure 1:
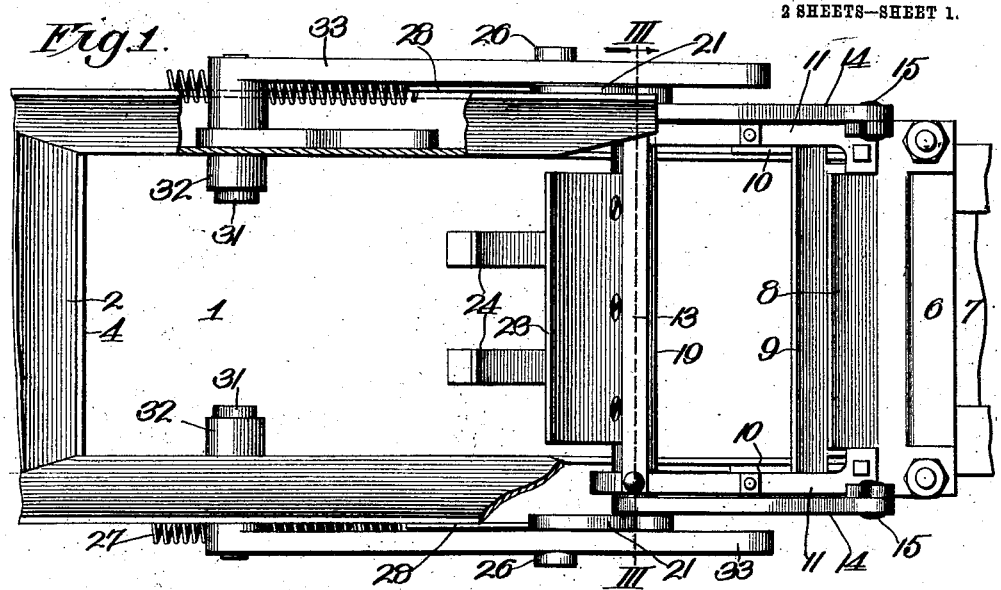
Figure 2:
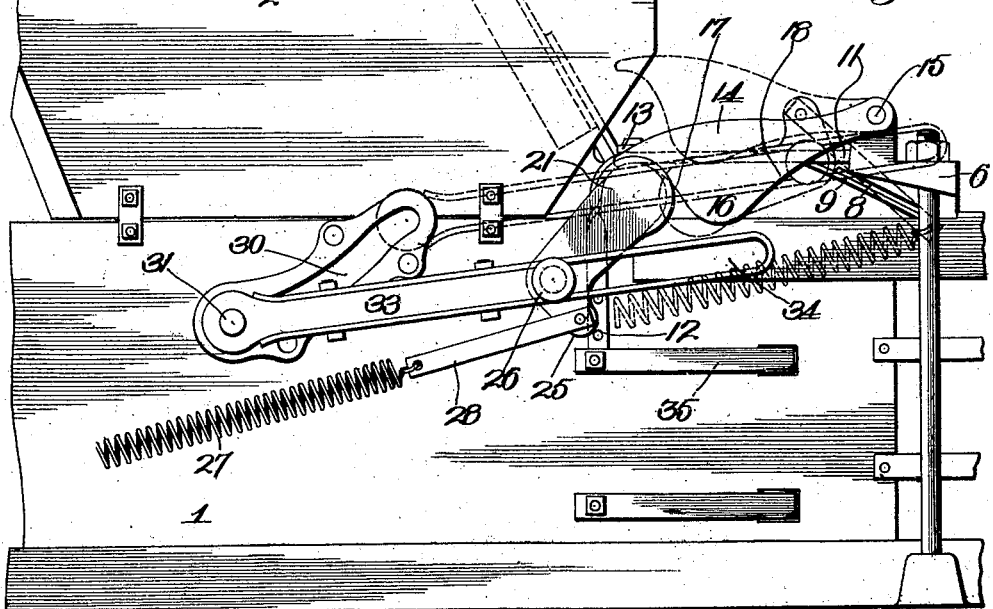

Figure 1, is a plan view of a part of a baling machine broken away and equipped with an automatic feed mechanism embodying my invention. Fig. 2, is a side view of the same. Fig. 3, is a vertical section taken on the line III—III of Fig. 1. Fig. 4, is a vertical longitudinal section taken on the line IV—IV of Fig. 3 but showing other features not disclosed by Fig. 3. Fig. 5, is a perspective view of a portion of the feeder to clearly show the shoulder on the crank-arm.

In the said drawings, 1 indicates a baling case of the usual or any preferred type, and 2 the hopper thereof.

3 is the plunger bar or beam and 4 the plunger, the latter being provided at its upper side with an apron-extension 5 to prevent baling material falling from the hopper into the baling case behind the plunger.

6 is a cross-bar at the junction of the baling-chamber and the compression chamber where the bale is wired, 7 indicating the top of said chamber, and 8 the rear end of said top, which, it will be noticed, projects rearwardly and upwardly and forms a stop to limit the upward movement of the folder 9 carried and held yieldingly upward by springs 10 secured to a pair of substantially right-angle bars 11 arranged with respect to the top of case to form in conjunction therewith a pair of longitudinal slots, the rear ends of the angle-bars being bolted as shown or otherwise secured to cross-bar 6 and their opposite ends to the side walls of the baling case as shown at 12 (see Fig. 2), it being noticed that the angle-bars are curved at their corners for a purpose which hereinafter appears, and are connected and braced by a cross-bar 13.

A pair of trigger-bearings 14 are pivoted at their front ends at 15 to upwardly projecting arms of cross-bar 6 and arranged parallel with and at the outer edges of angle-bars 11, these trigger-bearings having rounded depending portions 16, concave at their rear edges as at 17 to form bearing surfaces and inclined at 18 at their front edges to form cam-surfaces, for a purpose which hereinafter appears.

19 is a cylindrical cross-bar fitting in the slots formed by and between the side walls of the press and the angle-bars 11, and provided outward of said walls with cylindrical enlargements 20 engaging the angle-bars 11 and the trigger-bearings 14 and provided outward of the latter with crank-arms 21. The cross-bar 19 is provided with an arm 22 to which is secured a plate 23 equipped with bars 24, said plate constituting the body-portion, and the bars the arms of the feeder. The crank-arms 21 are provided with offsetting lugs 25, and with headed-pins 26 and pivotally connecting said lugs 25 with retractile springs 27 are links 28, the rear ends of the springs being adapted to be secured to the baling-case in any suitable manner, not shown, it being noted in this connection that the bar-links 28 are in the same vertical plane as the shoulders 29 formed on the outer sides of the crank-arms 21 and near their lower ends.

30 indicates slots formed in the side walls of the baling-case and extending generally in an upward and forward direction. 31 are bolts extending through said slots, and journaled on said bolts within the baling-case are rollers 32. Pivotally secured on the outer ends of said bolts are bars 33 provided with longitudinal slots 34 engaging the necks of the headed-pins 26.

In practice the parts normally occupy the position shown in Figs. 1 and 2, in which figures it will be noticed the feeder projects upward and rearward into the hopper from the front end of the guide slots formed by the baling-case and bars 11, it being also noticed that the bars 33 are so disposed that the rollers 32 are in the path of the plunger. With the parts in the positions referred to the baling material is thrust downward into the hopper and baling-case, the plunger being of course withdrawn, and when the latter starts forward through the instrumentality of any suitable power it comes into engagement with rollers 32 and forces the latter forward and upward because they have to follow the slots 30. By thus forcing said rollers forward and upward, the bars 33 are caused to push against the headed-pins 26 and thus cause the feeder to swing downward in the hopper and force the baling material therein down into the baling-case in advance of the plunger, the parts being so timed in actual practice that the feeder sweeps downward past the front end of the plunger and almost in contact with the latter so that said parts shall coöperate in shearing or tearing apart the bulk of the baling material below from that which may still remain in the hopper rearward of the sweep of the feeder. By the time the plunger has moved the rollers to the position shown in Fig. 4, the bars 33 having swung the crank-arms to the position shown most clearly in dotted lines, Fig. 2, at which time the feeder is depending vertically into the baling-case and the plunger has gained on the feeder so as to be about in contact therewith, it being understood that in the swing of the feeder the concave rear edges 17 of plates 14 form a bearing to resist the forward pressure of the cylindrical enlargements of the feeder to compel the latter to swing as described instead of moving forward. The continued advance of the plunger now brings its pressure squarely against the vertically depending feeder and as a result of such pressure the trigger-bearings 14 are caused to swing upward as indicated in dotted lines Fig. 2, to permit the feeder to move bodily in the slots hereinbefore referred to, until the advance movement of the plunger ceases, at which time the feeder occupies substantially the position shown in Fig. 4. The crank-arms of the feeder at such time are projecting forward and upward and the springs 27 are under heavy tension because the originally rear end of the bar-links 28 are now forward of their opposite ends, the links being forced to the position referred to (shown in dotted lines Fig. 2 and full lines Fig. 4) because of the engagement of the shoulders 29 with said bar-links. When thus arranged it will be noticed that the feeder bridges the space above the plunger at the front end thereof and that the apron or extension 5 of the plunger prevents the rollers 32 from dropping down into the path of rearward movement of the plunger. Now as the plunger recoils—and it will always recoil because there is no baling material wedged in between it and the hopper or top of the case,—the feeder under the pull of the springs 27 on the bar-links is swung upward until it engages the underside of cross-bar 13, and slides back in its guide slots as the slots 34 of bars 33 permit the feeder to slide rearward nearly to its original position. As soon as the plunger withdraws beyond the rollers 32 the springs 27 through the medium of the bar-links 28 complete the rearward sliding movement of the feeder, the cylindrical enlargements 20 by engagement with the cam-edges 18 of the trigger-bearings forcing the latter upward and out of the way, and in the initial portion of such movement of the feeder the headed-pins 26 slide back to the rear ends of slots 34, the last portion of the movement of the crank-arms causing their headed-pins 26 by engagement with the front ends of slots 34, to force the bars 33 rearward, the bolts 31 traveling downward and rearward in slots 30 to redispose the rollers 32 in the path of the plunger, the feeder being returned to its original position in the hopper.

The folder 19 performs the usual functions of rollers located at the top of baling presses, that is prevents the main portion of the bale from springing back and interfering with the easy and proper insertion of the division board through the top of the baling-case forward of the hopper. The side walls are equipped with retainers 35 to prevent the bale expanding materially upon the recoil of the plunger and to square up the division board.

From the above description it is apparent that I have produced a baling press embodying the features of advantage enumerated as desirable, and I wish it to be understood that I reserve the right to make such changes as properly fall within the spirit and scope of the appended claims.

Having thus described the invention what I claim as new and desire to secure by Letters Patent, is:—

1. A baling press, comprising a baling-case having a superposed hopper and a longitudinal guideway rearward of the hopper and provided in its side walls with downwardly and rearwardly inclined slots, trigger-bearings suitably pivoted and having portions depending into the horizontal plane of the guideway, a feeder, comprising a cross-bar formed with cylindrical parts engaging the guideway and initially engaging the rear edges of said depending portions of the trigger-bearings, and a part projecting from the cross-bar and initially projecting upward into the hopper, crank-arms projecting from the ends of said feeder externally of the baling-case and provided with pins, bars provided with slots engaging said pins and provided with pins engaging the first-named or baling-case slots and initially projecting into the baling-chamber at the rear ends of said slots, and a reciprocatory plunger adapted in its advance movement to force said pins upward and forward in the last-named slots to cause said slotted bars to swing the feeder downward through the hopper and into the baling-case.

2. A baling press, comprising a baling-case having a superposed hopper and a longitudinal guideway rearward of the hopper and provided in its side walls with downwardly and rearwardly inclined slots, trigger-bearings suitably pivoted and having portions depending into the horizontal plane of the guideway, a feeder, comprising a cross-bar formed with cylindrical parts engaging the guideway and initially engaging the rear edges of said depending portions of the trigger-bearings, and a part projecting from the cross-bar and initially projecting upward into the hopper, crank-arms projecting from the ends of said feeder externally of the baling-case and provided with pins, bars provided with slots engaging said pins and provided with pins engaging the first-named or baling-case slots and initially projecting into the baling-chamber at the rear ends of said slots) and a reciprocatory plunger adapted in its advance movement to force said pins upward and forward in the last-named slots to cause said slotted bars to swing the feeder downward through the hopper and into the baling-case; said plunger then engaging the feeder and causing it to move forward in the guideway and incidentally swing the trigger-bearings upward out of its path by engagement with the depending portion of said bearings.

3. A baling press, comprising a baling-case having a superposed hopper and a longitudinal guideway rearward of the hopper and provided in its side walls with downwardly and rearwardly inclined slots, trigger-bearings suitably pivoted and having portions depending into the horizontal plane of the guideway, a feeder, comprising a cross-bar formed with cylindrical parts engaging the guideway and initially engaging the rear edges of said depending portions of the trigger-bearings, and a part projecting from the cross-bar and initially projecting upward into the hopper, crank arms projecting from the ends of said feeder externally of the baling-case and provided with pins, links pivoted at their front ends to said crank-arms below the pins thereof, retractile springs connected to the opposite ends of said links, bars provided with slots engaging said pins and provided with pins engaging the first-named or baling-case slots and initially projecting into the baling-chamber at the rear ends of said slots, and a reciprocatory plunger adapted in its advance movement to force said pins upward and forward in the last-named slots to cause said slotted bars to swing the feeder downward through the hopper and into the baling-case; said links being adapted to be engaged and swung forwardly by the pins of the slotted bars to tension said retractile springs.

4. A baling press, comprising a baling-case having a superposed hopper and a longitudinal guideway rearward of the hopper provided in its side walls with downwardly and rearwardly inclined slots, trigger-bearings suitably pivoted and having portions depending into the horizontal plane of the guideway, a feeder, comprising a cross-bar formed with cylindrical parts engaging the guideway and initially engaging the rear edges of said depending portions of the trigger-bearings, and a part projecting from the cross-bar and initially projecting upward into the hopper, crank-arms projecting from the ends of said feeder externally of the baling-case and provided with pins, links pivoted at their front ends to said crank-arms below the pins thereof, retractile springs connected to the opposite ends of said links, bars provided with slots engaging said pins and provided with pins engaging the first-named or baling-case slots and initially projecting into the baling-chamber at the rear ends of said slots, and a reciprocatory plunger adapted in its advance movement to force said pins upward and forward in the last-named slots to cause said slotted bars to swing the feeder downward through the hopper and into the baling-case; said plunger then engaging the feeder and causing it to move forward in the guideway and incidentally swing the trigger-bearings upward out of its path by engagement with the depending portion of said bearings; said links being adapted to be engaged and swung forwardly by the pins of the slotted bars to tension said retractile springs.

5. A baling press comprising a baling-case having a superposed hopper and a longitudinal guideway rearward of the hopper and provided in its side walls with downwardly and rearwardly inclined slots, a rigid cross-bar at the front ends of said guideway, a resilient folder underlying the cross-bar and extending downwardly and forwardly into the baling-case, springs secured to the folder and to a rigid part of the case in the plane of the top of the guideway and holding said folder pressed upwardly, trigger-bearings suitably pivoted and having portions depending into the horizontal plane of the guideway, a feeder, comprising a cross-bar formed with cylindrical parts engaging the guideway and initially engaging the rear edges of said depending portions of the trigger-bearings, and a part projecting from the cross-bar and initially projecting upward into the hopper, crank-arms projecting from the ends of said feeder externally of the baling-case and provided with pins, bars provided with slots engaging said pins and provided with pins engaging the first-named or baling-case slots and initially projecting into the baling-chamber at the rear ends of said slots, and a reciprocatory plunger adapted in its advance movement to force said pins upward and forward in the last-named slots to cause said slotted bars to swing the feeder downward through the hopper and into the baling-case.

In testimony whereof I affix my signature, in the presence of two witnesses.

GEORGE E. RIDER.

Witnesses:
 H. C. RODGERS,
 FRANK R. GLORE.